Oct. 30, 1962 W. F. BUTLER 3,061,263
CLAMPING DEVICE
Filed Jan. 16, 1959 2 Sheets-Sheet 1
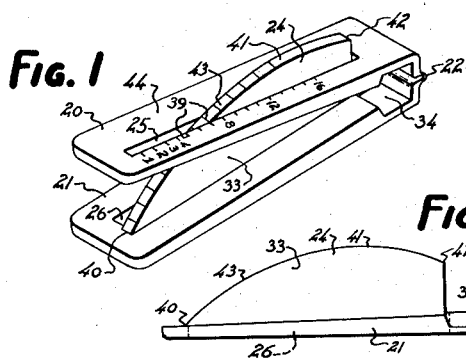
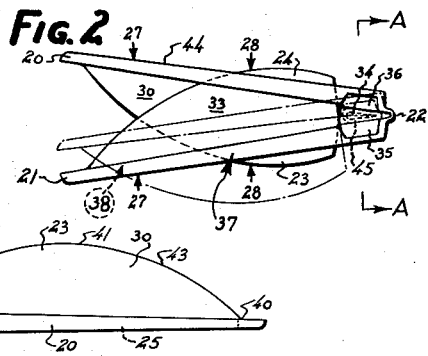
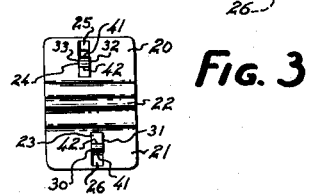
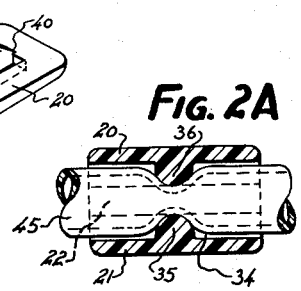
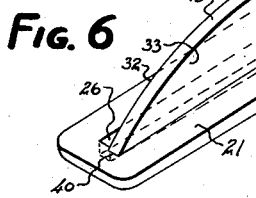
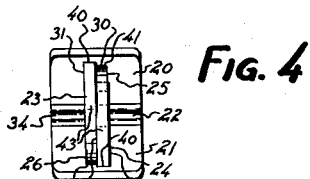
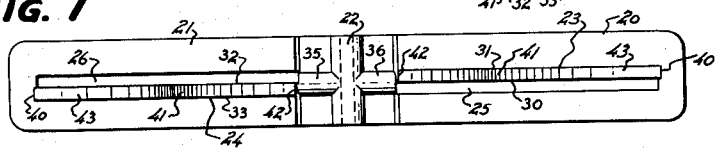
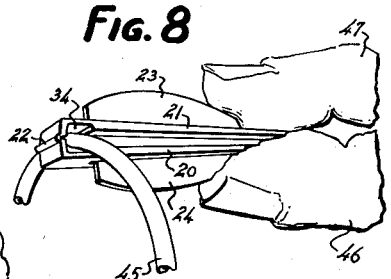
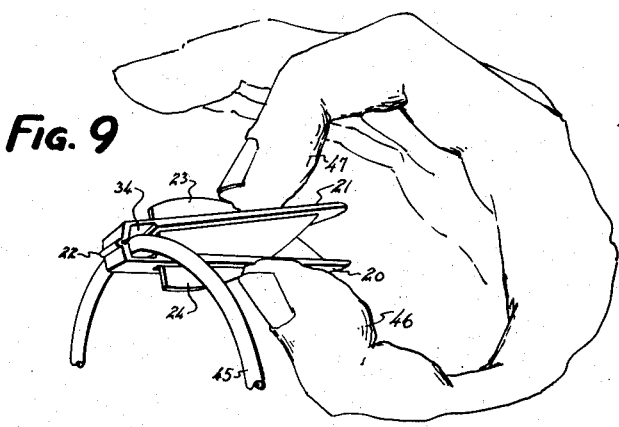
INVENTOR.
WILLIAM F. BUTLER
BY
ATTORNEY Oct. 30, 1962  W. F. BUTLER  3,061,263
CLAMPING DEVICE
Filed Jan. 16, 1959  2 Sheets-Sheet 2
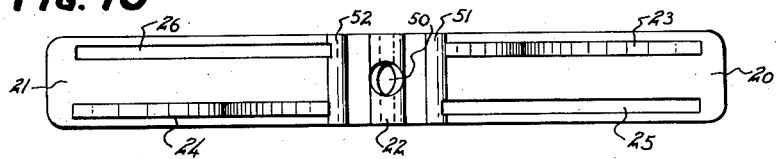
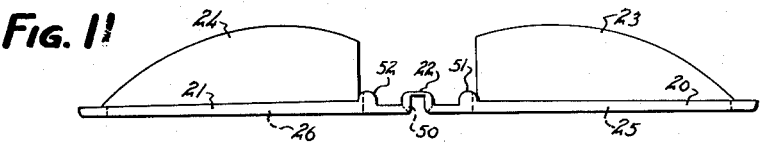
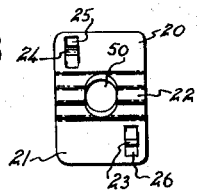
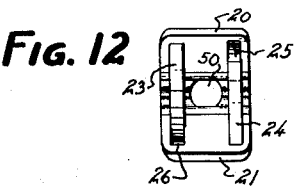
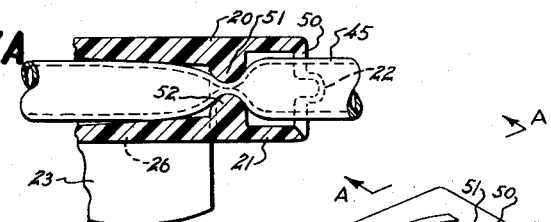
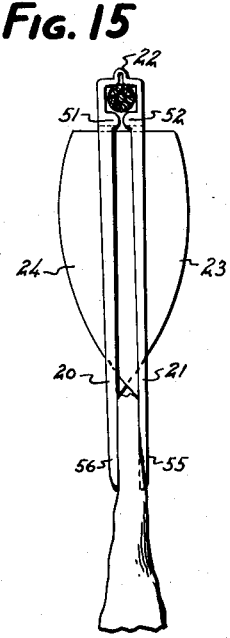
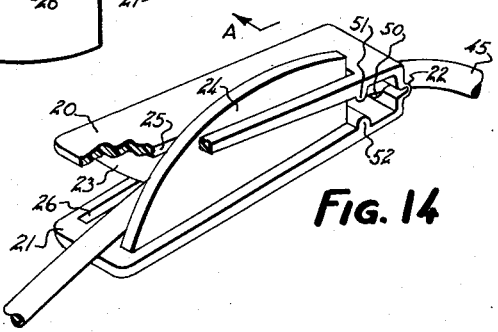
INVENTOR.
WILLIAM F. BUTLER
BY
ATTORNEY

United States Patent Office 3,061,263
Patented Oct. 30, 1962

3,061,263
CLAMPING DEVICE
William F. Butler, 73 Villanova Drive, Oakland 11, Calif.
Filed Jan. 16, 1959, Ser. No. 787,159
13 Claims. (Cl. 251—9)

This invention relates to clamps and in particular to clamps where one-hand rapid and accurate actuation is required.

The invention was conceived in working with the problems encountered in the hospital equipment field, but its principle has far wider application, including those industries and laboratories where the rate of flow of air or fluids is controlled in flexible walled tubing by changing the effective cross-sectional size of the tubing passage by applying external pressure to the tubing. Another field of application of the principal of this invention is where the accurate spacing apart or the holding together of two elements is to be accomplished. In this latter case, the spacing or holding together may be accomplished by suitably shaped gripping or jaw members placed at one end or the other of the clamp where they will not interfere with the actuation of the lever arms.

In compliance with the statute (35 U.S.C. 112), I shall set forth the best mode for carrying out the invention which has so far occurred to me, but with the understanding that the appended claims are not to be limited to this one embodiment.

The problem in the hospital equipment field which led to this invention had to do with intravenous feeding of patients where various conditions of urgency and accuracy must be met. One problem is to get an accurate regulation of fluid flow from the supply flask to the needle when feeding the patient. Another problem is to be able, under certain conditions, to get an immediate cessation of flow or an immediate full flow, followed by intermediate flow conditions.

In the past, various means of accomplishing this purpose have been used.

An early device was a clamp which depended on a screw clamping action. All adjustments were possible from full on to full off, but its action was slow and while operable with one hand, it was anything but conveniently so. In the operating room particularly, the anesthesiologist is presented with extreme problems on which depend the life of the patient. If he had five hands, it would still not be all he could desire in emergency situations. His need to adjust a flow from full on to full off and all stages in between is immediate! He is not working in time units of seconds, but rather fractions thereof. Clamps operating on a screw thread principle gave accurate and positive control of flow from full on to full off, but proved inadequate when an emergency required him to make this adjustment immediately, with one hand.

Another device was the so-called V or V clamp which depended on a gradually squeezing action of the tube from the open part of the V for full open flow to fully closed at the closed end of the V. In theory, this clamp appeared to hold promise, but in practice it failed. Accurate adjustment required repositioning the fingers and hand because of overshoot to open or close. In the full open position, no compression was exerted on the tube and the V clamp would slide down the tube and when again needed for adjustment, was the object of a frustrating hunt under the operating table by a person who did not have the time to hunt for it. Also, the sliding action cut the tubing, causing leaks.

A third type of "clamp" was an overriding tube an inch or two in length, fitting over the flow tube. The overriding tube, usually made of flexible plastic, had ductile metal wires embedded in it and depended on bending the tube and wires at an angle to produce a corresponding bend in the flow tube to constrict the flow opening. It was immediately adjustable with one hand, but in practice it tended to straighten out and not hold a setting.

Another type of clamp was the roller type with the roller advancing in a slot which varies its compression on the tube. This like the V clamp, depended to a great degree upon the outside diameter, wall thickness, and composition of the flow tube for its action. In actual practice, it tended to slip on the tube allowing greater than wanted flow with harmful results. This was particularly true if the flow tube was wet, as it often was. Furthermore, at full open position, it too was likely to slip down and become lost.

A further drawback to the roller clamp and the screw clamp was that they were multi-part devices which required assembly, and were expensive to manufacture.

It should be realized that in modern practice one of these clamps is used with each intravenous injection set and is used once only. Being an expendable item, the cost becomes important, particularly in these days when every effort is to lower the cost of medical care.

The present invention makes it possible, by a mere shift in the compressive force exerted by the thumb and forefinger, to achieve any flow condition in a fraction of a second and for the medical attendant to be able to do it with one hand while the other hand is busy assisting elsewhere. The broad advantages to be achieved by the present invention apply in many other uses, as will be apparent from the following description.

One of the most important objects of my invention is to provide a clamp which can be actuated between the index finger and the thumb; which can be adjusted from a full closed to a full open position in a fraction of a second by a simple rolling movement of the finger and thumb over the opposite pairs of juxtaposed control surfaces, thereby shifting the compressive force on the control surfaces; and which can be made as a one-piece molding so that when folded together at the point of use to form the clamp, it provides its own self-proportioning frictional surfaces to hold the clamp in any position from full closed to full open.

Another object of the invention is to provide a clamp control means whereby one hand operation is possible, usually with the thumb engaging two juxtaposed pressure areas and the forefinger engaging two like juxtaposed pressure areas, and actuation is achieved by rolling the thumb and finger from one of these areas to the other.

Another object is to provide a simple, low-cost, one-piece molded clamp which can be bent together at the point of use to form the complete clamp and which, in the course of being bent together, can embrace a flexible-walled tubing, or whatever else is being held in a fixed position by means of the clamp.

Another object is to provide a one-piece, self-contained clamp which when bent into operative form, provides its clamp own frictional holding means and has these means arranged so the frictional effect increases proportionally the tighter the clamp is closed.

Another object of my invention is to provide in juxtaposed position on each side of the clamp the means for tightening and the means for loosening the clamp so these means are easily engaged by the thumb and forefinger to operate the clamp by a shift in the compressive force.

Another object of my invention is to provide a clamp which does not have to have the flexible tubing threaded through the throat, but which has a throat that will form around the tubing at the time and point of use as the clamp levers are brought into operative position.

Other objects and advantages will become apparent from the following description of a preferred form of my clamp taken in connection with the drawings, in which:

FIG. 1 is a view in perspective showing the clamp in a partially closed position;

FIG. 2 is a view in side elevation of the clamp of FIG. 1, with a piece of flexible tubing dotted in;

FIG. 2a is a view in cross section taken on the line A—A in FIG. 2;

FIGS. 3 and 4 are views in end elevation looking at the right and the left ends respectively of FIG. 2;

FIG. 5 is a view in side elevation of the clamp blank opened out and in the form in which it comes out of the mold;

FIG. 6 is a view in perspective, also of the clamp blank as it comes out of the mold;

FIG. 7 is a view in plan of the blank of FIGS. 5 and 6;

FIG. 8 is a view in perspective showing the clamp in use and being actuated to a full closed position by the thumb and finger;

FIG. 9 is a view like FIG. 8 showing the clamp partially opened by rocking the fingers along the juxtaposed control surfaces;

FIG. 10 is a plan view of a modification where the device is used primarily for regulating the flow of a liquid through a flexible tube;

FIG. 11 is a view in side elevation of the device of FIG. 10;

FIG. 12 is an end view of the device of FIGS. 10 and 11 when the clamping levers are in operative position;

FIG. 13 is a like view of the hinge end;

FIG. 14 is a view in perspective showing the clamp in partially closed position;

FIG. 14a is a view in cross section taken on the line A—A in FIG. 14; and

FIG. 15 is a side view of a modified form of gripping jaw.

The Lever Arms

Turning now to the drawings, it will be seen that my improved clamp is made up of a pair of lever arms 20, 21 with a pivot or fulcrum means at 22. Preferably this fulcrum is made as a thin walled section of the same material from which the lever arms are molded. For this purpose, I have found polypropylene, polyethylene or nylon to be very suitable. My invention is not limited to the use of any particular material nor to any particular kind of fulcrum 22, however. It could be a hinge or interlocked ends on the lever arms 20 and 21 and still accomplish the purposes of my invention.

The Actuating Fins

To each lever arm is secured a blade-like fin 23, 24. Preferably the fin 23 is moulded integral with its related lever arm 20 and likewise the fin 24 to the lever arm 21. These fins may be spaced apart (see FIGS. 10 to 14) or they may be spaced so they have a close sliding contact on each other as in FIGS. 1 to 9. In the latter arrangement, they can add to the frictional holding effect which is explained later.

The Juxtaposed Control Surfaces

In each lever arm directly opposite to each fin 23, 24 is a slot. The fin 23 is aligned with and slides in the slot 26; and the fin 24 is aligned with and slides in the slot 25. The slots serve several purposes.

First, the slot provides clearance through one lever arm so the fin attached to the other lever arm can pass through the slot and bring the fin up above the outer face of the lever arm to a position where the fin and the outer face of the lever arm are in juxtaposed relationship subject to being moved by a shift in the compressive force effected merely by a rolling movement of the thumb and finger on one hand. This rolling movement applies pressure to the fin as it releases pressure on the lever arm or it applies pressure to the lever arm as it releases pressure on the fin. This opening, closing and adjusting of the clamp by pressure applied in the one direction is an important operational feature of my clamp and will become clearer as this description proceeds.

Relating what has just been said to FIGS. 1 and 2 of the drawings, the fin 24 is shown projecting through the slot 25 in the lever arm 20, and the fin 23 is projecting through the slot 26 in the lever arm 21.

In order to achieve the opening and closing of the clamp by the rocking action of the finger and thumb respectively on the lever arms and the portion of each fin which projects through its respective slot in the opposite lever arm, I prefer to shape the fins, when viewed in profile (see FIGS. 5 and 6), with a circular outline starting at 40 on each lever arm, rising to a maximum height at 41 and terminating at 42. This shape gives the edge or control surface 43 of each fin a gentle sloped relationship to the control surface face 44 (see FIG. 1) of each lever arm. It is the edge 43 of each fin and the surface 44 of each lever arm on which the finger or thumb is placed (see FIGS. 8 and 9) to operate the clamp. For that reason, I prefer to knurl or otherwise roughen the control surfaces 43 and 44 so the fingers do not slip in making delicate adjustments.

By varying the shape, that is the contour, of the fins the clamp can be given any desired performance curve. For example, the steeper the slope on the fin from 40 to 41, the faster the clamp will open as the compressive force is shifted onto the control surface 43 on each fin. Conversely, the flatter the curve on the fin from 40 to 41, the slower the clamp will open. This feature enables me to provide a performance curve and so to get minute adjustment where desired, or to get a fast adjustment, or to get a combination of both.

Another feature of my clamp arising from the projection of the fin through the slot in the lever arm is that reference marks may be applied to one or both these parts. These reference marks will be related to the use being made of the clamp. They could comprise symbols or reference lines molded in the face 43 of the fin and a scale molded in the face 44 of each lever arm alongside the slot. These are illustrated in the drawings at 39.

As used in this specification and in the claims "terminating at its outer end substantially flush with the lever arm" means that the edge 43 near the actuating end of the clamp at 40 does not project above the surface of the lever arm when the two arms are closed together in the maximum gripping position of the clamp (FIG. 8). This is beneficial in the operation of the clamp between the thumb and the forefinger, for it means there will be a smooth transition of the compressive force as it shifts from the lever arm at 44 to the control surface 43 of the fins 23, 24.

Pressure applied to the lever arm control surfaces 44 in the direction of the arrows 27 will bring the lever arms toward each other and pressure applied to the control surfaces 43 on the fins 23 and 24 in the direction of the arrows 28 will cause the lever arms to move apart. For the purposes of this feature of my invention, it matters not whether each fin is a loose fit or a snug-sliding fit in its related slot. Where the slot is a loose fit on the fin and no appreciable frictional effect is present, other means will be substituted to provide a friction or holding effect (a) to permit the relative movement of the lever arms as explained above and (b) to hold the lever arms in whatever position they are in when the finger and thumb are removed from the juxtaposed control surfaces.

The Frictional Effect

In my preferred structures as shown in the drawings, I have the slots also perform the function of providing the frictional or holding effort between the pivoted lever arms. This is a second purpose or use that can be made of the slots 25 and 26. In supplying this functional relationship between the fin 24 and its slot 25, and between the fin 23 and its slot 26, I have made the side walls 30, 31 of the fin 23 and the side walls 32, 33 of the fin 24 parallel. To get a frictional fit of each fin in its respective slot, I have molded the slots with a slight taper (.005 inch). To get more friction, the slot can be bowed in or narrowed between its ends. With this construction the lever arm body will be bowed out slightly as the fin moves in the slot.

The width of each slot at its end near the pivot point (the end where the fin first enters the slot when folding the clamp together) preferably is substantially the same width as the fin and it tapers inwardly toward the other end. This taper need not be much, and the amount of frictional load imposed between the fins and their respective slots by the taper should be balanced between (a) what is needed to hold the gripping jaw on whatever work it is doing, and (b) what compressive pressure can be applied comfortably by the thumb and finger as they rock on the control surfaces 43, 44 in operating the clamp.

While the friction element and the actuating members 23, 24 have been shown made in one piece, it is possible to make these as separate pieces. However, for all practical purposes this amounts only to making in two pieces what I have shown in one piece.

The Proportioned Friction Effect

A word should be said about the beneficial effect obtained by having the clamp held by the frictional engagement between surfaces on the longitudinally extending lever arms 20, 21 and the longitudinally extending fins 23 and 24. It comes about in this way: The closer the gripping jaws 35, 36 are moved together about a flexible tube, the more force it takes to hold the jaws in clamping position, because of the counter force coming from the crushed resilient tube. One of the advantages of my invention is that the closer together the lever arms are moved (to tighten the clamp) the farther out on the lever arms from their pivoting end are the two areas of maximum frictional contact. This increase in length of the holding lever multiplies the holding force of the clamp as the throat closes together. To illustrate, in FIG. 2 the arrow 37 indicates the general area of frictional contact. If the lever arms are moved closer together so the arm 20 is in the dotted line position, the general area of maximum frictional contact is moved out on the lever arms 20 and 21 to the dotted arrow 38. By well known rules of mechanics, this multiplies the holding power of the clamp.

There are other ways of obtaining this frictional effect, and my invention is not limited to any particular arrangement, except as required by the claims and the rules on equivalency.

For example, the slot can be made with parallel walls, and the taper can be incorporated in the fin. Another arrangement is to provide a taper so the face 30 on the fin 23 and the face 32 on the fin 24 are caused to rub on each other. Of course, this last arrangement then becomes a combination of the frictional effect between the fins themselves and between one wall of each slot.

The frictional interference to movement or release of the clamp can be tailored to fit the job the clamp is to do. For example, its use as a clothes pin would require a greater frictional hold than its use in the hospital or laboratory where the wall of the resilient tubing is easily flattened.

In some of the claims I have referred to the friction element which has been described so far as the fins 23 and 24. Each friction element 23, 24 extends from its respective lever arm 20, 21 in a plane normal to the axis of the pivot 22. The edge on each of the lever arms refers to the edge of the slots 25 and 26.

The Gripping Jaws

The location of the gripping jaws on the clamp will vary with the use to which the clamp is put. In the clamp described, the gripping jaws are located at 34 and are formed by two ribs or pressure pads 35 and 36 molded in the lever arms 21 and 20 respectively near the pivot or fulcrum 22. These serve well where the clamp is being used to flatten together the walls of a flexible tubing to regulate the rate of liquid flow through it. Other forms of gripping elements may be provided at either end of the lever arms and those at the pivot or fulcrum end may extend beyond the pivot to the opposite side. I have illustrated one such set of gripping elements in FIG. 15. The gripping jaws or working ends of the clamp may hold things apart or hold them in a desired spaced relationship. As used in the claims "clamping means" refers to any form of gripping jaws or positioning lugs secured to the lever arms, whether to serve as a clamp, technically speaking, or to position an element or to hold apart any pair of elements.

One-Piece Construction

One of the advantages of the clamp described is that it can be molded in one piece and can be applied to a flexible tube without disconnecting the tube to insert the tube through a hole in the clamp. FIGS. 5 and 6 show the clamp as molded in one piece. This is a distinct advantage of the clamp for it requires no labor for assembly and has no parts to become misplaced. When it comes from the mold it is ready to be used, and the folding into operative position is effected either at the point of use by the user, or at the point of assembly.

Operation of the Clamp

FIGS. 2, 8 and 9 show the clamp folded together around a flexible tube 45. One procedure in adjusting flow of liquid in the flexible tube 45 is to pinch the clamp to full closed position (FIG. 8) by pressure of the finger and thumb on the control surfaces 44 of the lever arms 20 and 21. Then, to regulate the fluid flow the thumb and finger 46 and 47 respectively are rocked over the control surfaces 44 up onto the juxtaposed control surfaces 43 of the projecting fins 23, 24 to shift the compressive force. Pressure on the fins 23, 24 overcomes the friction effect and moves the lever arms apart. Because the fin control surfaces 43 are in juxtaposition to the control surfaces 44 of the lever arms a comfortable rocking movement of the thumb 46 and finger 47 can transfer the desired compressive force from one or the other and in a fraction of a second can move the clamp from a full closed to a full opened position or to any adjusted position in between. Note too that the clamp is moved from closed to open position, or vice versa, by a compressive force always applied in the same direction.

The above explains the one-hand operational feature of my invention which is to bring into juxtaposed position between the thumb and a finger on the same hand the four control elements which effect the opening or closing of the clamp, and which make it possible to vary this opening or closing by rocking the thumb and finger onto one pair or the other pair of the pressure elements while retaining a controlling pressure on the elements being released.

Modifications

The principle of my invention lends itself to various modifications, and I shall now illustrate several modifications, with the understanding, however, that many others are possible within the scope of the appended claims.

In FIGS. 10 to 14 like reference numerals have been used for like parts, and the same principle is employed as in the clamp just described. The difference lies in providing a hole 50 in the pivot area through which the flexible tube may be passed. In this case the gripping jaw on the clamp is provided by ribs 51, 52, and the fins 23, 24 which actuate the lever arms on the opening movement, and which provide the friction holding means.

are spaced apart to allow room for the tube 45 to pass lengthwise between the lever arms and the fins.

In FIG. 15 I show the lever arms 20, 21 lengthened somewhat to indicate the portions 55, 56 which can be used to clamp pictures to a line in a photographic show, to clamp clothing to a clothesline or to a wire clothes hanger or to hold parts spaced apart as desired. Any form of gripping fingers can be substituted for those shown at 55, 56 in FIG. 15 and they can be located where needed along, or at the ends of, the lever arms.

Another modification which gets a degree of the benefit of my invention is to omit one of the fins 23 or 24 and use only one. This gives a clamp using the frictional feature of my invention as described above and a certain degree of the adjusting benefit. I mention it because I have included claims which cover this modification.

The invention set forth in the specification and drawings above will find utility in many fields outside the hospital equipment field. An example is where it is necessary to control fluid flow in deformable fluid lines such as rubber tubes. In many scientific processes, both experimental and production, wherein flexible tubing is employed to transmit fluids, it is required that the fluid passing through the tubes either be metered to maintain a specified rate of flow or be turned on and off at particular times with precision. Lines to fluid manometers also require precise control where it is desired to lock in fluid pressure values to analyze pressure gradients.

From the foregoing description and drawings will become apparent the novel operation obtained by having the operating surfaces of the lever arms and the fins arranged in juxtaposition so that by merely rocking these surfaces between the thumb and forefinger, the clamp can be moved from full on to full off or can be stopped accurately at any in between adjustment. In operation, as the compressive force is shifted from one juxtaposed operating surface to the other, full control is retained over both surfaces. In addition, there is (a) the low-cost feature of the clamp which is molded as one piece; (b) which requires no further step in its manufacture; and (c) which folds together as a complete clamp either at its point of use or assembly with related parts.

While I have shown one general form in which the control and holding effects may be obtained, my invention lends itself to incorporation in many different forms which will be readily apparent to those skilled in the art and my intention is that the appended claims will cover such modifications as the prior art permits.

What I claim is:

1. A clamp having an adjustable gripping opening, including a pair of lever arms; a pivoted fulcrum means securing said arms to each other at one end; a blade-like fin secured to each of said lever arms, said fin having, in elevation, a sloping contour, terminating at its outer end remote from the pivoted ends of the levers and substantially flush with the lever arm; each of the aforesaid lever arms have a perforation therein aligned with said fin which is secured to the opposite lever arm, to provide an open slot into which each fin may enter when the clamp is closed by bringing the lever arms together; the thickness of the fin and the width of the slot being such that a portion of the fin engages a side wall of the slot and a predetermined sliding frictional fit is obtained, whereby the gripping opening can be adjusted by holding the ends of the levers between the first finger and thumb of one hand and rocking the thumb and finger toward the end of the lever arms to close the opening and in the opposite direction to apply pressure on the edge of the tapered fins to move said lever arms apart to enlarge the gripping opening.

2. A clamp comprising a pair of lever arms pivotally connected at one end to permit movement of the other ends of said lever arms toward and away from each other, means for holding said lever arms relative to each other in any desired clamping position, said means including a friction element secured to one of said lever arms extending from the latter in a plane normal to the axis of the aforesaid pivot, an edge on the other lever arm likewise in a plane normal to the axis of said pivot with which said friction element has frictional sidewise engagement, and said friction element and said edge on the other lever arm with which it has frictional engagement extend longitudinally of their respective lever arms, whereby as said lever arms are moved toward each other, the areas in frictional contact are progressively farther out from the pivoting end of said lever arms thereby multiplying the force needed to overcome the frictional effect to move said lever arms apart.

3. The device of claim 2 in which said longitudinally extending friction element varies in height above the face of the lever arm to which it is secured, said variance being in a direction dropping away from the pivoted end of said lever arm to provide a somewhat sloping contour for said friction element, whereby points on the edge of said friction element will be flush with the face of said lever arms at successive points along the latter as the clamp is actuated from its closed to open position.

4. In a clamp, the combination of a pair of pivotally mounted operating levers having opposed pressure applying operating surface means, one of which is longitudinally inclined with respect to the other from the pivotal mounting adjacent one end thereof, a clamping means disposed between said levers adjacent said pivotal mounting, pressure releasing means extending longitudinally of one of said pairs of levers and projecting outwardly therefrom and beyond the pressure applying surface means of the other lever, said pressure applying means and said pressure releasing means being in variable sidewise frictional engagement at all times, and said pressure releasing means having an operating surface which is oppositely inclined with respect thereto, whereby said operating levers may be oppositely moved on their pivotal connection to compress or release said clamping means upon a rocking compression action on said oppositely inclined operating surfaces extending longitudinally of and outwardly beyond said pair of pivotally mounted operating levers.

5. A finger operated clamp comprising a pair of lever arms pivotally connected at one end to form a throat and to permit movement of the other ends of said lever arms toward and away from each other, common means for oppositely moving and holding said lever arms relative to each other in any desired clamping position, said means including a finger engaging friction element rigidly secured to each of said lever arms, each friction element having a flat surface extending from and along its respective arm in a plane normal to the axis of the aforesaid pivot; an edge on each of the lever arms, likewise in a plane normal to the axis of said pivot, and with which the said flat surface of the friction element on the other arm has varying frictional sidewise engagement; whereby when said friction elements are in engagement with the cooperating edges on the respective arms, said frictional engagement will hold said lever arms in fixed, but yieldable, relative position.

6. A finger operated clamp comprising a pair of lever arms pivotally connected at one end to permit movement of the other ends of said lever arms toward and away from each other, clamping means secured to said lever arms, finger engageable cooperating means extending lengthwise of each of said lever arms for oppositely moving and holding said lever arms relative to each other in any desired clamping position, said means including a varying engageable friction element carried by each of said lever arms, each friction element extending lengthwise of its respective arm in and having a flat surface forming a plane normal to the axis of the aforesaid pivot; an edge also on each of the lever arms, likewise in a plane normal to the axis of said pivot, and with which the said flat surface of said friction element on the other arm has varying frictional sidewise engagement on relative movement of said arms toward and away from each other; whereby when said friction elements are in engagement with the cooperating edges on the respective arms, said frictional engagement will hold said lever arms in varying fixed, but yieldable, relative position.

7. The device of claim 6 in which said lengthwise extending friction elements vary in height above the face of the lever arm to which each is secured, said variance being in a direction dropping away from the pivoted end of said lever arms to provide a somewhat sloping contour for said friction elements when viewed in elevation, whereby points on the edge of said friction elements will lie flush with the face of said lever arms at successive points along the latter as the clamp is actuated from its closed to open position.

8. The device of claim 6 in which the edge on each lever arm with which the friction element contacts defines a slot.

9. The device of claim 8 in which said slot is wider in relation to the width of the cooperating friction element at the pivoted end of the lever arm than it is at the other end.

10. The device of claim 8 in which the clearance between the interengaged friction generating parts is progressively less as they come together farther from the pivoted end of the lever arms.

11. A clamp comprising a pair of lever arms pivotally connected at one end to permit movement of the other ends of said lever arms toward and away from each other, means for reversely moving and holding said lever arms relative to each other in any desired clamping position, said means including a friction element extending longitudinally of one of said lever arms for a major operating portion of the length thereof and having an operating surface which is inclined from said lever arm in a plane normal to the axis of the aforesaid pivot, and a surface on the other lever arm likewise extending in a plane normal to the axis of said pivot with which said friction element has variable longitudinal frictional engagement.

12. In a finger operated clamp, the combination of a pair of pivotally mounted operating levers each having lengthwise extending pressure applying operating surface means which are oppositely inclined from their pivotal mounting and having clamping means therebetween, and a cooperating lengthwise extending pressure releasing means projecting through one of said pressure applying operating surface means from said other of said pair of levers and having an operating surface which is oppositely inclined with respect thereto, and said pressure applying means and said pressure releasing means being in sidewise frictional engagement, whereby said oppositely inclined operating and releasing surfaces may be simultaneously operated to apply or release pressure by a lengthwise rocking movement of a finger thereon.

13. In a finger operated clamp, the combination of a pair of pivotally mounted operating levers each having pressure applying surfaces which are oppositely inclined from their pivotal mounting, clamping means disposed between said pair of levers and operated thereby, pressure releasing means extending lengthwise of one of said pair of levers and frictionally engaging said pressure applying surface of the other of said pair of levers lengthwise thereof, and said pressure applying and releasing means being adjacent and inclined in opposite directions lengthwise of said levers for rocking finger operating engagement thereon.

References Cited in the file of this patent

UNITED STATES PATENTS

| | | |
|---|---|---|
| 1,174,004 | Greenwald | Feb. 29, 1916 |
| 1,344,433 | Blackburn | June 22, 1920 |
| 1,517,162 | King | Nov. 25, 1924 |
| 1,610,622 | Shaweker | Dec. 14, 1926 |
| 1,944,116 | Stratman | Jan. 16, 1934 |
| 2,092,522 | Post | Sept. 7, 1937 |
| 2,127,190 | Solomon | Aug. 16, 1938 |
| 2,127,257 | Hornberger | Aug. 16, 1938 |
| 2,746,064 | Ausmus | May 22, 1956 |